US012729707B2

(12) United States Patent
Brewer

(10) Patent No.: US 12,729,707 B2
(45) Date of Patent: Sep. 8, 2026

(54) FASTENER, FASTENING ASSEMBLY AND METHOD OF INSTALLING A FASTENER

(71) Applicant: AVDEL UK LIMITED, Woolston (GB)

(72) Inventor: Jonathan Brewer, Letchworth Garden City (GB)

(73) Assignee: Avdel UK Limited, Woolston (GB)

(*) Notice: Subject to any disclaimer, the term of this patent is extended or adjusted under 35 U.S.C. 154(b) by 241 days.

(21) Appl. No.: 18/612,617

(22) Filed: Mar. 21, 2024

(65) Prior Publication Data

US 2024/0318679 A1 Sep. 26, 2024

(30) Foreign Application Priority Data

Mar. 23, 2023 (EP) .................................... 23163880

(51) Int. Cl.
*F16B 19/05* (2006.01)
*B21J 15/50* (2006.01)

(52) U.S. Cl.
CPC ............... *F16B 19/05* (2013.01); *B21J 15/50* (2013.01)

(58) Field of Classification Search
CPC ................................. F16B 19/05; B21J 15/50
See application file for complete search history.

(56) References Cited

U.S. PATENT DOCUMENTS 2,764,045 A * 9/1956 Koenig .................. B21J 15/022 72/481.3
4,437,805 A * 3/1984 Smith ..................... F16B 19/05 411/361
4,813,834 A * 3/1989 Smith ..................... F16B 19/05 411/361
4,850,771 A * 7/1989 Hurd ....................... F16B 29/00 29/523
6,341,917 B1 * 1/2002 Schubring ............. B29C 65/645 403/299
6,665,922 B2 * 12/2003 Schultz .................. F16B 19/05 411/361

(Continued)

FOREIGN PATENT DOCUMENTS

CN 110145525 A 8/2019
GB 2145185 B 10/1985
WO 2022123805 A1 6/2022

OTHER PUBLICATIONS

European Search Report Dated Sep. 8, 2023 cited in corresponding EP Application No. 23163880.0.

*Primary Examiner* — Sean M Michalski

(57) ABSTRACT

A method of installing a fastener to a structure with a first and a second workpiece, fastening assembly and fastener is disclosed herein. Provided is a stud having a head, and a shaft. The head and shaft extend along a longitudinal axis (X) and define a shaft length (Ls), wherein the shaft comprises a locking portion, the locking portion defining a shaft diameter (Ds). A collar is adapted to be fitted over the locking portion of the shaft and includes a first collar end, a second collar end and a central through bore which extends from the first collar end to the second collar end. The central through bore is defines a bore diameter (Db) and a main portion is adapted to be swaged onto the locking portion. A ratio of the bore diameter (Db) to the shaft diameter (Ds) is above 1.10:1.

15 Claims, 9 Drawing Sheets

(56) References Cited

U.S. PATENT DOCUMENTS 7,677,852 B2 * 3/2010 Donovan ............ F16B 19/1063 411/416
8,794,890 B2 * 8/2014 Pinheiro ................ F16B 19/05 411/361
9,488,213 B2 * 11/2016 Corbett ............... F16B 19/1063
9,562,556 B2 * 2/2017 Haylock ................ F16B 4/004
10,626,908 B2 * 4/2020 Morden ................ F16B 31/021
11,441,591 B2 * 9/2022 Couderc .................. F16B 5/02
2005/0044684 A1 * 3/2005 Haines .................. B25B 21/002 29/700
2007/0003393 A1 * 1/2007 Mercer .................. B21J 15/022 411/361
2010/0260572 A1 * 10/2010 Wehrmeister ........... F16B 19/05 411/43
2010/0266363 A1 * 10/2010 Mercer .................... B21J 15/28 411/168
2015/0078859 A1 * 3/2015 Haines, Jr. .............. F16B 19/05 411/361
2015/0252833 A1 * 9/2015 Brewer .................. B21J 15/022 411/361
2017/0051777 A1 * 2/2017 Slaughter ............... B21J 15/022
2017/0284442 A1 * 10/2017 Smith .................... B21J 15/022
2019/0003506 A1 * 1/2019 Yan ........................ B21J 15/022
2020/0018338 A1 * 1/2020 Hikosaka ................ F16B 19/05
2020/0018339 A1 * 1/2020 Hikosaka ................ F16B 19/05
2020/0141438 A1 * 5/2020 Wojciechowski ...... F16B 19/05
2022/0193920 A1 * 6/2022 Mathis ................. B25J 15/0019
2022/0196045 A1 * 6/2022 Starbuck ................. F16B 19/05
2022/0397145 A1 * 12/2022 Wilcox ................... F16B 19/05
2023/0114567 A1 * 4/2023 Wilcox ................... F16B 19/05 411/366.1
2023/0121175 A1 * 4/2023 He ........................... H01R 4/06 411/360
2024/0165693 A1 * 5/2024 Brunet ................... B21J 15/285
2024/0418197 A1 * 12/2024 Wollard, Jr. ............ F16B 19/05
2025/0084884 A1 * 3/2025 Brunet .................... F16B 19/05

* cited by examiner

FASTENER, FASTENING ASSEMBLY AND METHOD OF INSTALLING A FASTENER

CROSS-REFERENCE TO RELATED APPLICATIONS

This application claims priority from European Patent Application No. 23163880.0, filed on Mar. 23, 2023, the entire disclosure of which is incorporated herein by reference.

BACKGROUND OF THE PRESENT INVENTION

The present invention relates to a fastener, and more particularly to a lockbolt fastener for securing workpiece members together. In particular, the present invention is adapted for the fixing of connectors to bus bars, for example busbars in electrical vehicle batteries. However, the present invention may also be used in other environments and have other applications, like for instance securing apertured workpiece members together.

Fasteners like lockbolt fasteners are widely used in several industries, notably to provide a high tensile strength joint and a high clamp load on a plurality of workpieces secured together thereby. Typically, such fasteners comprise a stud having locking grooves and a collar adapted to be swaged into the locking grooves.

Document EP2895753 discloses for instance such a lockbolt comprising a collar and a pin. The pin comprises a pin head and a pin tail adapted to be inserted though aligned apertures in workpiece members. The pin tail comprises a locking portion with locking grooves, and a single pull groove provided between the locking portion and an end face of the pin tail remote from the pin head. The collar is adapted to be fitted over the locking grooves and swaged onto the locking grooves.

EP4055285A1 discloses a lockbolt or two-part fastener comprising a pin (or stud) and a collar. The collar comprises a first collar end, a second collar end, and a collar cavity. The pin is configured to be at least partially received by the collar cavity. The pin comprises a pull region generally cylindrical and smooth and configured to form at least one of an annular shoulder, a groove, a thread, and other feature thereon responsive to forcible contact from a fastening collar installation apparatus.

The conventional method to remove the collar once mounted to the pin (also called stud), is to cut the collar into pieces along an axial direction using a special removal tool. Since the collar has been hardened during installation, the force required for the cutting of the collar shall be bigger than that required for installation. This tends to result in plastic deformation and damages can occur.

Document US2019003506A1 uses for instance a reusable single groove riveting system and a reusable single groove riveting bolt (also called pin or stud) with a collar. The method of use includes an installation method and a removal method which ensures the reusability of the riveting bolt. A removal tool is used which includes a gun body member, a turning tool member, a guiding and positioning member, and a pneumatic/electric motor member. The removal tool is adapted to be guided and positioned around the collar and a cutting tool is adapted to cut the different portions of the collar.

The removal of the collar is realized with a special tool and implies the cutting of the old collar.

JPH0925922A discloses a ball-end weld stud adapted to cooperate with a collar. The stud comprises a threaded portion and the collar is adapted to be fitted over the threaded portion and swaged onto the threaded portion. The collar also comprises an enlarged hexagonal base adapted to cooperate with a removal tool such that the collar can be unscrewed from the stud after being swaged onto the threaded portion.

Such fastener allows a removal from the collar without cutting the collar or using a special tool, but a need still exists to improve such fastener in order to better control their assembly.

Examples of the present disclosure aim to address the aforementioned problems.

According to an aspect of the present disclosure there is a fastener comprising a stud having a head, and a shaft extending along a longitudinal axis and defining a shaft length, wherein the shaft comprises a locking portion, said locking portion defining a shaft diameter. The fastener further comprises a collar adapted to be fitted over the locking portion of the shaft, with a first collar end, a second collar end, a central through bore extending from the first collar end to the second collar end, the central through bore defining a bore diameter, and a main portion adapted to be swaged onto the locking portion, wherein a ratio of the bore diameter (Db) to the shaft diameter (Ds) is above 1.10:1.

Such ratio of the bore diameter to the shaft diameter is particularly unusual. Indeed, normally the bore diameter is only slightly larger than the shaft diameter in order to avoid too high installation forces or limit the constraints in the material. However, it happens that a bore diameter sensibly greater than the shaft diameter allows obtaining high residual clamp load with such fastener and an increased resistance to thermal expansion and vibration loosening. Besides, such fastener presents good electrical conductivity and prevents the formation of hot spots due to its particular geometry. Thus, such fastener may be used in a plurality of applications, and notably in high voltage power distribution arrangement and allow a thermal management and a thermal safety in battery assemblies of electrical vehicles, for instance. Such fastener can also be quickly installed (versus screwed joints) and the risk of cross-threading is totally eliminated. Such fastener is also simple to manufacture.

In an embodiment, a ratio of the bore diameter to the shaft diameter is above 1.15:1. Such ratio allows a high residual clamp load. For instance, such ratio allows for a fastener with a shaft diameter of nominally 6 millimeters a residual clamp load above 7 kilonewtons and even above 10 kilonewtons.

In an embodiment, the locking portion is a threaded portion, and the collar further comprises a drive portion adapted to be actuated by a removal tool. The swaged collar can thus be unscrewed for repair or maintenance and even retightened afterwards in re-assembly multiple times. Eventually the swaged collar can also be replaced with a conventional nut, if the swaged collar gets damaged as removed or is lost after removal.

In an embodiment, the collar comprises a flange provided at the first collar end, the drive portion extending between the flange and the main portion. The drive portion is distant from the main portion and is not deformed during the installation.

In an embodiment, the main portion, before being swaged onto the locking portion, comprises a cylindrical body and a chamfer arranged at the second collar end. Such geometry allows an installation tool to easily deform the main portion and then be removed.

In an embodiment, the central through bore is cylindrical. The manufacture of the collar is facilitated.

In an embodiment, the head of the stud has an underside comprising displacement lobes. The displacement lobes are particularly advantageous when the stud is a clinch stud and to increase the resistance to vibration. In an embodiment, eight displacement lobes or six displacement lobes can be arranged on the underside of the head.

In an embodiment, the stud is made in a first material, the collar is made in a second material, different from the first material, wherein the tensile strength of the first material is at least 2.5 times the tensile strength of the second material. The strength of the shaft is higher than the strength of the collar, such that the locking portion of the shaft can plastically deform the surface delimiting the central through bore of the collar. This difference in strength is important to making the fastener work. If the collar was stronger, or the stud weaker, then the shaft would stretch and the thread pitch of a locking portion for instance grow and distort, meaning the collar could not be easily removed and refitted. It is important that the stud threaded portion (when provided) does not deform during placing.

In an embodiment, the first material is a high tensile steel, and the second material is an annealed, low-carbon steel. Thus, the fastener is an all-steel fastener. For example, the first material is a high tensile steel Property Class 10.9. Alternatively, the collar can be made with copper. Annealed copper for instance is far softer than low-carbon steel and requires a lower placing force. In this case, the stud could be made of a lower-tensile steel such as Property Class 8.8.

In an embodiment, the stud is a clinch stud or a weld stud or a loose bolt or a glue stud or a self-taping stud or an embedded stud or a moulded-in stud. The stud can thus be connected to a structure in different ways, depending on the application, environment and performances to obtain.

The present invention is also directed to a fastening assembly comprising a fastener as previously mentioned and a structure, wherein the fastener or stud is assembled to the structure and secured to said structure by the collar, and wherein the main portion of the collar, after being swaged onto the locking portion of the stud has a conical shape. The conical shape of the deformed main portion allows easy removal of an installation tool.

In an embodiment, the structure is a busbar or a busbar component, and the fastener enables the fixation of connectors to the busbar.

Finally, the present invention is also directed to a method for installing a fastener as described to a structure with a first workpiece and a second workpiece, comprising the steps of:

- providing an installation tool comprising a nosepiece provided with a tapered anvil;
- connecting the stud to the first workpiece such that the shaft at least partially protrudes from a front side of the structure;
- fitting the second workpiece over the shaft;
- fitting the collar onto the protruding end of the shaft from the front side of the workpiece;
- actuating the installation tool such that the tool engages the shaft, and the anvil pushes the collar toward the structure;
- continuing actuating the tool such that the anvil swages the collar onto the locking portion, thereby deforming the main portion to give it a conical shape and locking the collar onto the locking portion.

The installation of the fastener is quick and enables a high residual clamp load in the structure. Indeed, the combination of the tapered anvil and the large clearance between the bore diameter and shaft diameter results in an unexpectedly high clamp load. The second workpiece can be a connector, a plate or a sheet or any other workpiece to be connected to the first workpiece. The first workpiece can be a plate, a sheet, a busbar, . . . .

In an embodiment, the anvil has an inclusive tapered angle between 4 and 12 degrees, and in particular of 8 degrees. Such tapered angle allows a smooth deformation of the main portion and an easy removal of the installation tool. The greater taper also helps the collar material flow deeper into the relatively sharp-crested locking portion and is particularly adapted to flow deeper in the 60°-degree profile of a metric thread. This depth of engagement can create a thread form in the collar bore that is able to withstand high re-tightening torque without stripping.

In an embodiment, the fastener is a steel fastener, in particular with a 6 millimeters shaft diameter, and is fixed to the structure with a residual clamp greater than 7 kilonewtons, and in particular greater than 10 kilonewtons. Typically, the fastener according to the invention can offer 13.5 Kilonewtons residual clamp.

BRIEF DESCRIPTION OF THE DRAWINGS

Various other aspects and further examples are also described in the following detailed description and in the attached claims with reference to the accompanying drawings, in which:

DETAILED DESCRIPTION OF THE PREFERRED EMBODIMENTS

The embodiments of the disclosure will be best understood by reference to the drawings, wherein the same reference signs designate identical or similar elements. It will be readily understood that the components of the disclosed embodiments, as generally described and illustrated in the figures herein, could be arranged and designed in a wide variety of different configurations. Thus, the following detailed description of the embodiments of the apparatus, devices, systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations.

Figure 1:
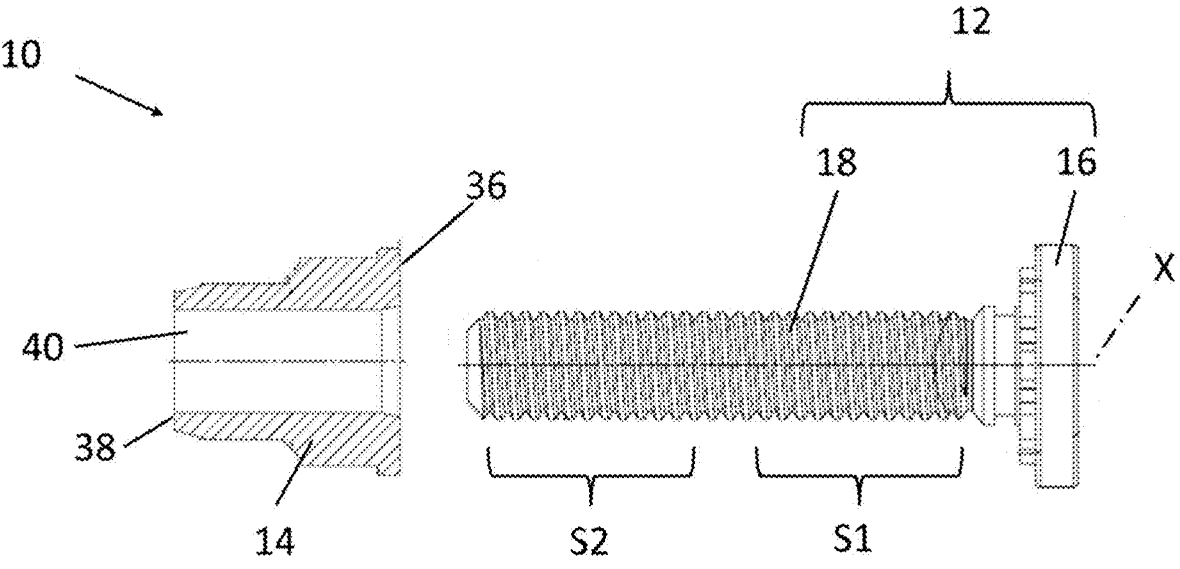
FIG. 1 shows a fastener according to an embodiment of the invention, the fastener comprising a stud and a collar.

FIG. 1 shows a first embodiment of a fastener 10 according to the invention. The fastener 10 comprises a stud 12 and a collar 14. The collar 14 is sized and shaped to mate with and be swaged onto the stud 12. More particularly the fastener 10 is a lockbolt or comprises a lockbolt.

Figure 2A:
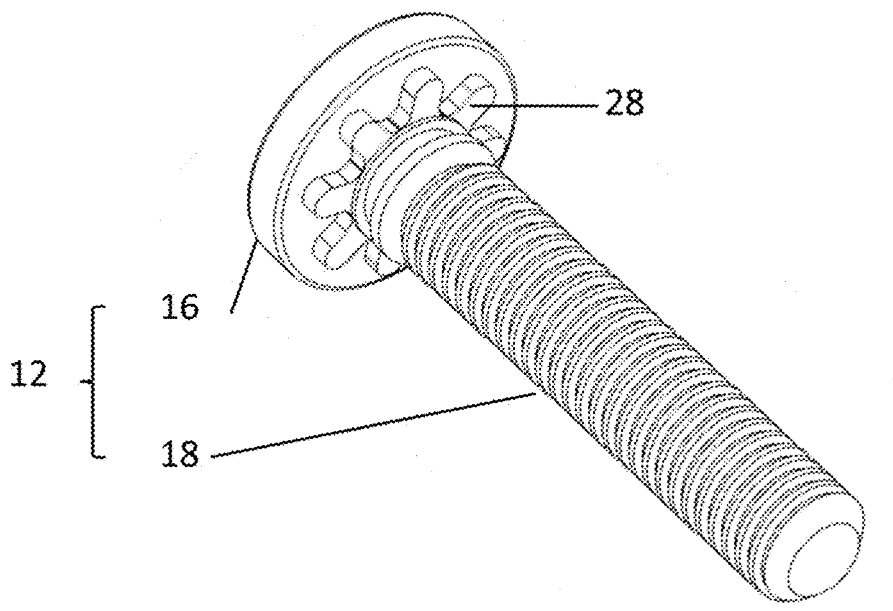
FIG. 2A, FIG. 2B and FIG. 2C respectively show a perspective view, a cross-sectional side view and a bottom view of the stud of the fastener of FIG. 1.
Figure 2B:
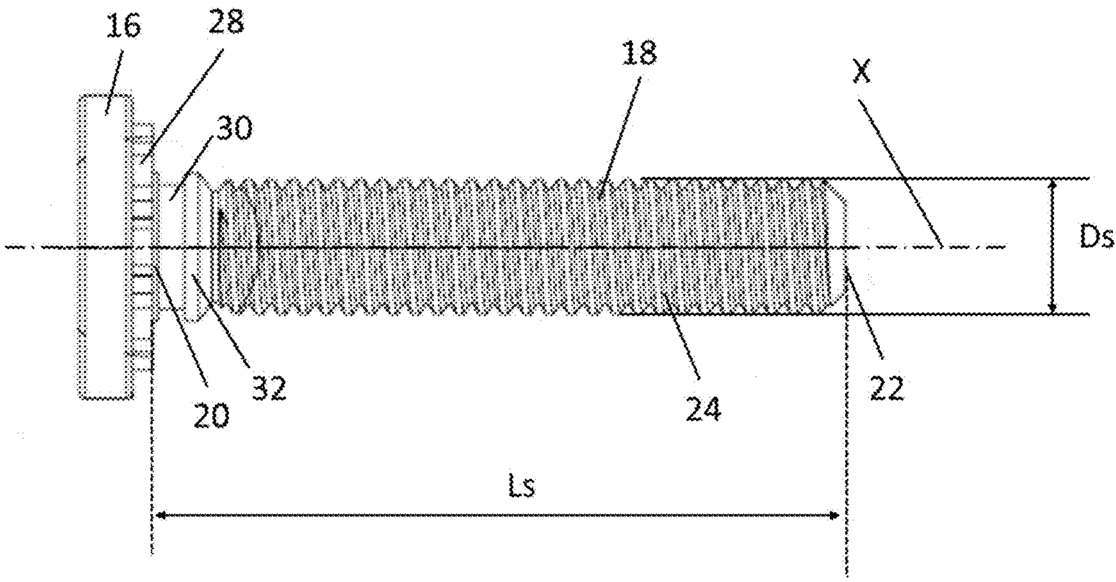
Figure 2C:
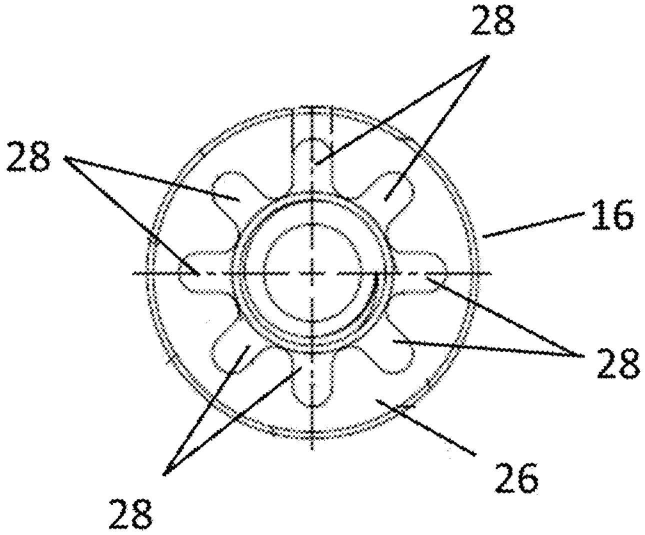

The stud 12 of FIG. 1 is shown in more details in FIG. 2A, FIG. 2B and FIG. 2C.

FIG. 2A is a perspective view of the stud 12 of FIG. 1. FIG. 2B is a cross-sectional view of the stud of FIG. 1 and FIG. 2C is a bottom view of the stud of FIG. 1. The stud 12 comprises a head 16 and a shaft 18. The shaft 18 extends from an underside of the head longitudinally along a longitudinal axis X. The shaft comprises a first end 20, connected to the head and a second end 22, opposite the first end. The shaft 18 defines along the longitudinal axis X a shaft length Ls between the first end 20 and the second end 22.

Figures 12A, 12B, 12C, 12D:
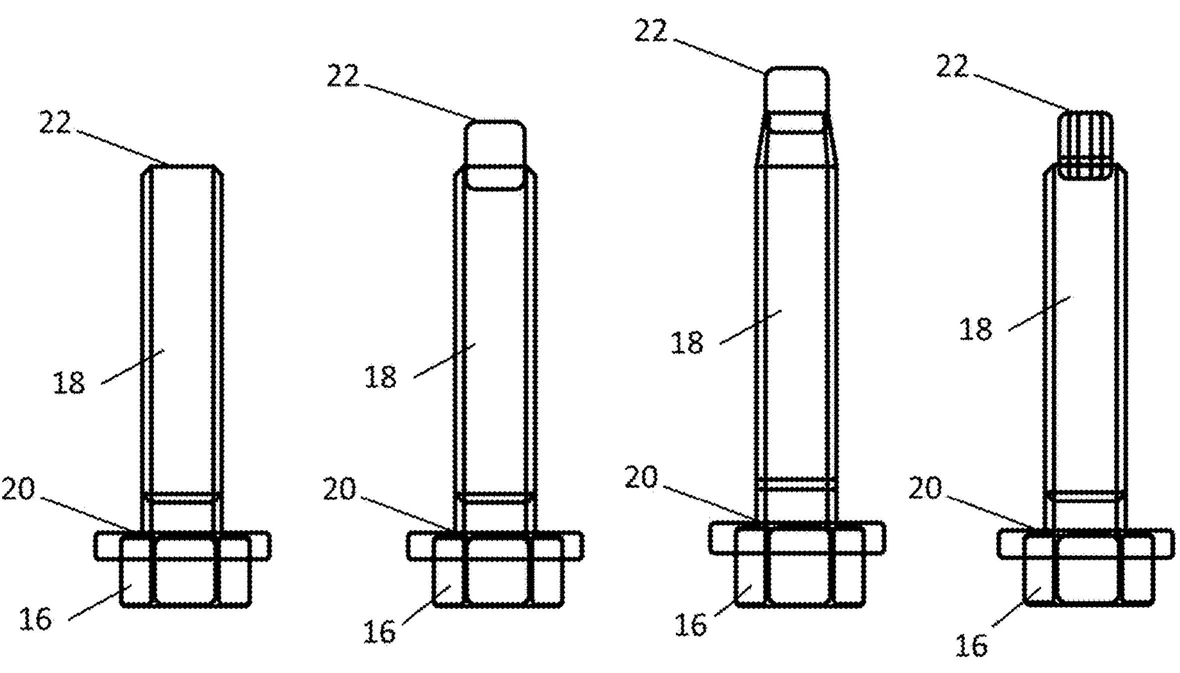
FIG. 12A, FIG. 12B, FIG. 12C and FIG. 12D show four alternative embodiments of a stud of a fastener according to the invention, wherein the stud of FIG. 12A comprises a standard flat tip, wherein the stud of FIG. 12B comprises a dog point tip, wherein the stud of FIG. 12C comprises a MAThread® tip, wherein the stud of FIG. 12D comprises a hexagon or external TORX® stem drive portion.

In the embodiment of FIG. 1; FIG. 2A, FIG. 2B and FIG. 2C, the second end 22 of the shaft 18 is a typical standard flat tip, as also depicted in FIG. 12A. However, in other alternative designs, the second end of the shaft may consist in a dog point, as depicted in FIG. 12B. The second end of the shaft may alternatively consist in a MAThread® tip as schematically represented in FIG. 12C. In another alternative, the second end of the shaft is a hexagon or a TORX® stem drive, as visible in FIG. 12D. Such tips are well known and will not be described in further detail.

Figures 13A, 13B:
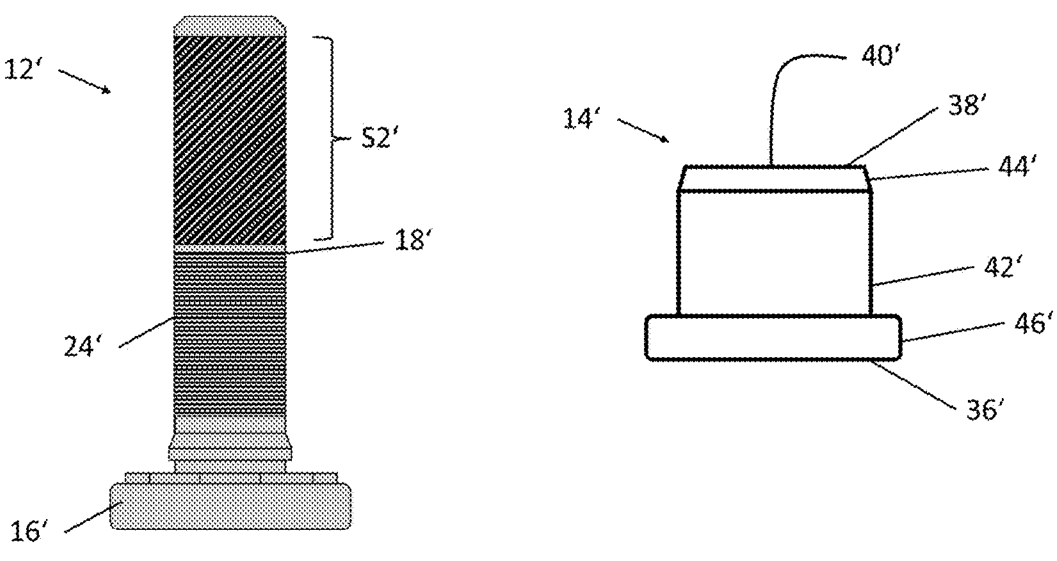
FIG. 13A and FIG. 13B show another alternative example of a stud and a collar from a fastener according to the invention.

As visible in FIG. 2A and FIG. 2B, the shaft 18 has a locking portion 24. The locking portion 24 comprises a constant or sensibly constant cross-section and defines a shaft diameter Ds. In the embodiment of FIG. 1, the locking portion 24 is a threaded portion and extends sensibly up to the second end 22 of the shaft 18. The shaft diameter Ds is to be understand as being the major diameter, measured from thread crest to crest, in case of a threaded locking portion. As mentioned, in the embodiment of FIG. 1, the threaded portion extends up to the second end of the shaft. However, the locking portion 24 may also comprise a plurality of annular locking grooves, as schematically depicted in FIG. 13A, and explained in more details below. In such case, the diameter Ds is measured from groove crest to crest. The threaded portion of the shaft of FIG. 1 extending up to the second end has two functions. A first segment S1 of the threaded portion in the vicinity of the first end 20 form the locking portion 24 for locking the collar 14 after swaging. A second segment S2 of the threaded portion in the vicinity of the second end 22 form a pulling portion (also called retaining feature) adapted to engage a drive nut of an installation tool, as described below. As shown in the embodiment of FIG. 1, the locking portion and/or the threaded portion of the shaft has a constant cross-section with a constant shaft diameter Ds.

The stud 12 is for instance a clinch stud capable of clinching itself when driven into a material.

The underside 26 of the head 16 may comprise, as visible in FIG. 2A and FIG. 2C, displacement features 28. More particularly, the underside 26 of the head adapted to face the outer surface of a first workpiece, may comprise displacement lobes 28. As visible in FIG. 2A and FIG. 2C, eight displacement lobes 28 are provided on the underside of the head. However, the number of displacement lobes may vary. The head 16 may be provided with three, six, eight or twelve displacement lobes. The displacement lobes 28 have for instance a symmetrical configuration and are used to increase the resistance to vibration and the torque needed to unscrew the collar. Fasteners presenting such feature are for instance known as Octolok® fasteners. The head 16 can be a flush head or a protruding head.

The first end 20 of the shaft is provided with a retention groove 30. The first end 20 of the shaft is provided with a retention ring 32. The retention groove 30 extends between the retention ring 32 and the displacement feature 28. Such stud 12 or clinch stud is adapted to be pre-installed in a hole (notably a punched hole) of a structure 34 and to cooperate with the collar 14. More particularly, the installation of the clinch stud in the hole is achieved by a pressing operation.

Figure 3A:
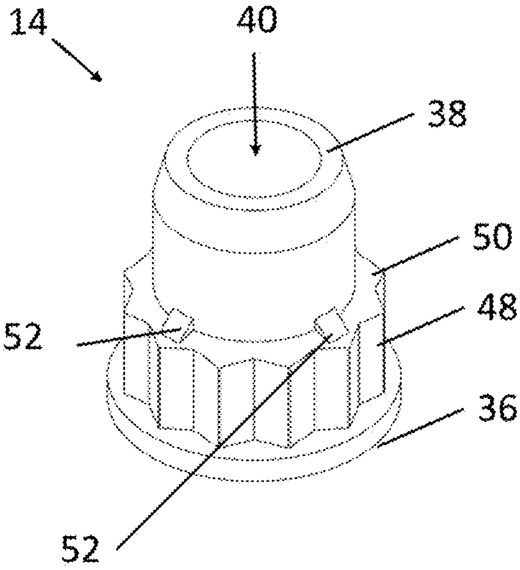
FIG. 3A and FIG. 3B respectively show a perspective view and a cross-sectional side view of the collar of the fastener of FIG. 1.
Figure 3B:
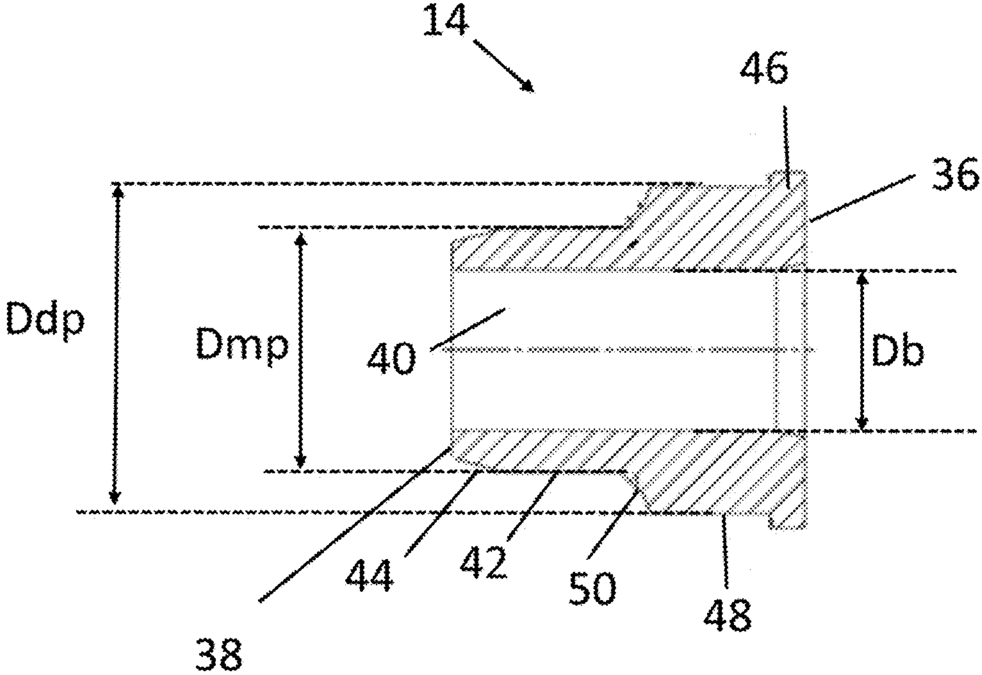

The collar 14 visible in FIG. 1 is shown in more detail in FIG. 3A and FIG. 3B. The collar 14 is adapted to be fitted over the locking portion 24 of the shaft 18. The collar 14 comprises a first collar end 36, a second collar end 38 and a central through bore 40 extending from the first collar end 36 to the second collar end 38. The central through bore 40 defines a bore diameter Db. The bore diameter is for instance constant along the central through bore 40. The collar 14 further comprises a main portion 42 adapted to be swaged onto the locking portion 24 of the shaft 18. The main portion is for instance sensibly cylindrical. As shown in FIG. 3A and FIG. 3B, the second collar end 38 is provided with a chamfer 44. The first collar end 36 is provided with a flange 46. The collar 14 may further comprise a drive portion 48. The drive portion 48 extends between the first collar end 36 and the main portion 42. The drive portion 48 more particularly extends between the flange 46 and the main portion 42. The main portion 42 extends between the second collar end 38 and the drive portion 48. The external diameter Dmp of the main portion 42 is smaller than the external diameter Ddp of the drive portion 46. An interface portion 50 may extend between the drive portion 48 and the main portion 42. The interface portion 50 may be a tapered portion. The interface portion 50 between the main portion 42 and the drive portion 48 may form a shoulder. Protrusions or indicator bars 52 may be provided on the interface portion between the main portion 42 and the drive portion 48. The indicator bars 52 are adapted to help identifying a full swage of the collar (as described below). The drive portion 48 is adapted to cooperate with a removal tool (not represented) for removing the collar 14 from the stud 12 after the swaging, when the locking portion 24 is a threaded portion. The drive portion 48 is for instance a 12 points drive portion. In another embodiment (not represented) the drive portion may be a conventional hexagon drive portion, or other polygonal shape, or multiple-lobed external form, . . . .

The collar 14 can be fitted over the shaft 18 and more particularly the locking portion 24. The bore diameter Db of the collar 14 is greater than the shaft diameter Ds, such that a ratio of the bore diameter Db to the shaft diameter Ds is above 1.10:1. More particularly, a ratio of the bore diameter Db to the shaft diameter Ds is above 1.15:1. Even more particularly a ratio of the bore diameter Db to the shaft diameter Ds is around 1.16:1. For instance, a ratio of the bore diameter Db to the shaft diameter Ds is below 1.5:1.

Figure 6:
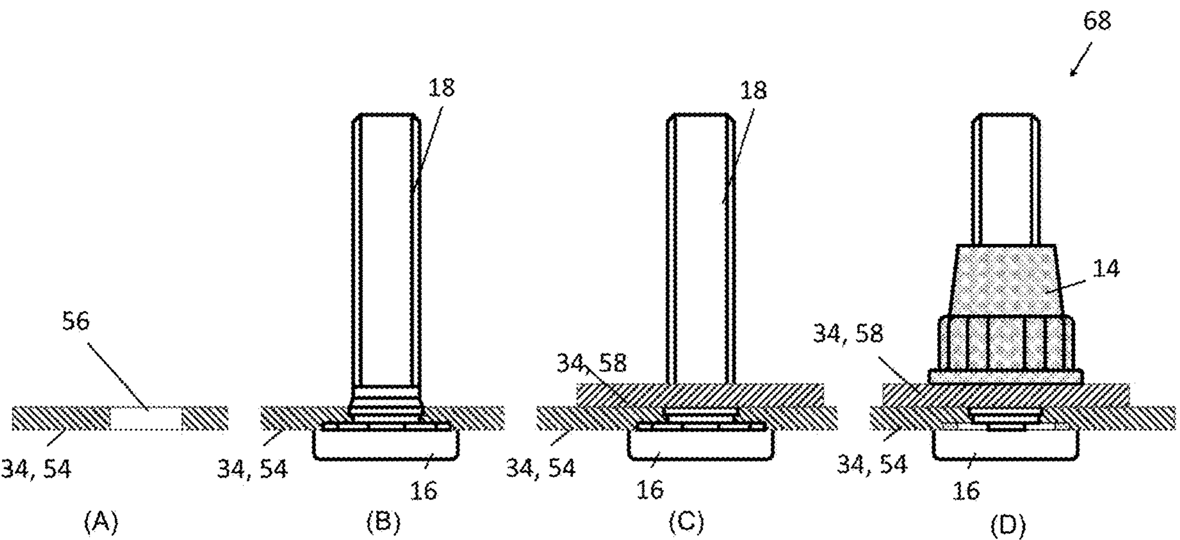
FIG. 6 schematically shows assembly steps of a fastener according to the first embodiment of the invention to a structure, the fastener comprising a clinch stud.

FIG. 6 schematically shows the different steps (steps (A), (B), (C) and (D)) for assembling the clinch stud of FIG. 1 to the structure 34. The structure 34 comprises for instance a first workpiece 54 with a hole 56. More particularly, the first workpiece 54 may be a busbar with a punched hole 56 (step (A) in FIG. 6). The busbar is for instance made of copper or aluminum. The stud 12 is pre-installed in the hole 56 of the first workpiece 54 (step (B) of FIG. 6). The stud 12 is for example a M6 stud and the force to clinch the stud to a busbar may be of about 20 kilonewtons. The stud 12 is clinched into the first workpiece 54 using a placing tool or a press tool (not represented). The stud 12 is clinched to the first workpiece 54 from a rear side of the workpiece until the head 16 contacts the rear side of the workpiece 54 and such that the shaft 18 at least partially protrudes from a front side of the first workpiece 54.

Figure 4:
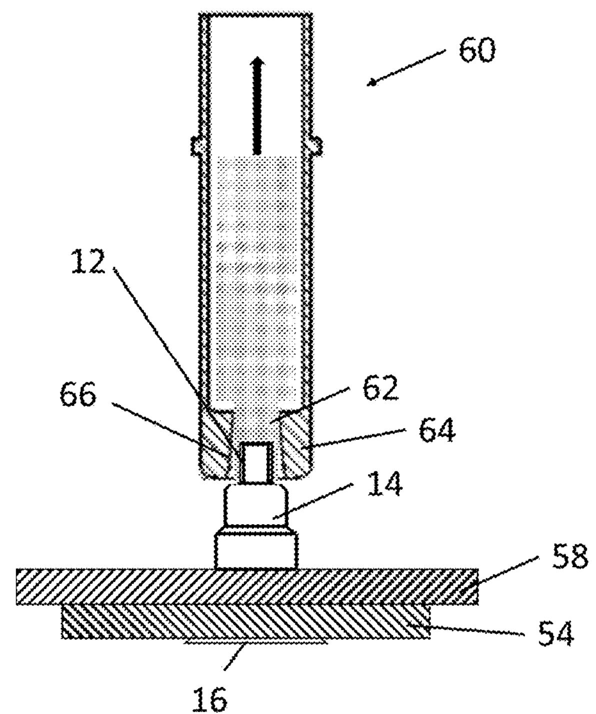
FIG. 4 shows a cross-sectional side view of the fastener of FIG. 1 engaged with an anvil and a drive nut of an installation tool.

For instance, if the first workpiece 54 is a busbar, the stud 12 can be clinched into the rear busbar at an early stage. The material of the first workpiece 54 (or the busbar) is forced to flow around the displacement features 28, thus delivering excellent torque-to-turn performance whilst the retaining ring 32 provides superior push-out values. The stud 12 is thus connected to the busbar (or first workpiece 54) and can be used at a later stage of a battery assembly, for example. In order to fix a connector (or more generally a second workpiece 58) to the busbar (or more generally to the first workpiece), the connector (or second workpiece 58) is fitted over the stud 12 (and more particularly, the connector or second workpiece 58 with a hole is fitted over the shaft 18). Then, the collar 14 is fitted over the shaft, such that the main portion 42 of the collar is facing the locking portion 24 of the shaft 18 (as seen for instance in FIG. 4). In a subsequent step (not shown in FIG. 6), an installation tool 60 is provided. The installation tool 60 is schematically depicted in FIG. 4. The installation tool 60 comprises for instance a hydraulic piston, a drive nut 62 surrounded by a nose piece 64 provided with a tapered anvil. In other words, the inside of the anvil "mouth" has a particularly conical form.

To swage the collar 14 onto the shaft 18, the installation tool first engages with the pulling portion of the shaft. The pulling portion (or second segment S2) is for instance threaded and the drive nut 62 spins onto the stud 12 (and more particularly onto the second segment S2 or onto the pulling portion of the shaft). The drive nut 62 spins onto a threaded segment (or engagement portion) of the shaft 18 until the anvil 66 arrives in abutment against the second collar end 22 (as depicted in FIG. 4). The drive nut 62 then stops spinning and a pulling force is then applied to pull the drive nut 62 inside the anvil, causing the anvil to plastically deform or gradually swage the main portion 42 of the collar 14 down into the locking portion 24, until a predetermined load is reached. When the predetermined load is reached, the pulling force is released, the anvil 66 disengages from the main portion 42 and the drive nut 66 unspins to disengage from the pulling portion or second segment S2, for instance at the same time. The installation tool 60 is then removed and a fastening assembly is realized (as visible in step D of FIG. 6 or in FIG. 5). In another alternative, the pulling portion of the shaft may be provided with retention features adapted to cooperate with complementary retention features of the installation tool. The installation tool pulls the stud, and the anvil is moved toward the workpieces 54,58 to gradually swage swaging of the main portion 42 of the collar 14 down into the locking portion 24. The external shape of the main portion 42 of the collar 14 is formed by the tapered anvil 66. The assembled collar 14 has thus a conical shape.

Figure 14:
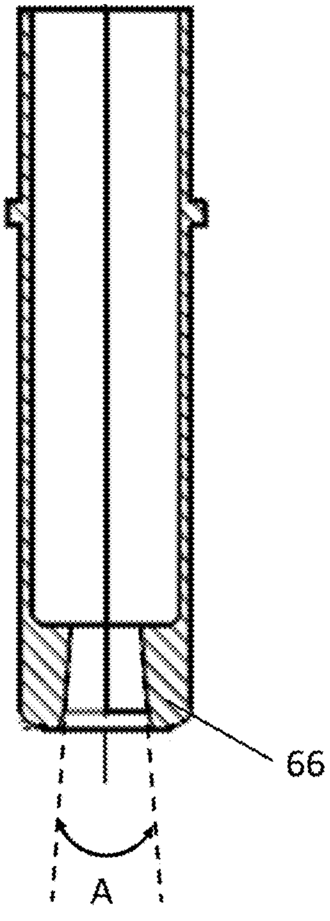
FIG. 14 shows a cross-sectional side view of the anvil of an installation tool for a fastener according to the invention.

The anvil 66 is schematically shown in FIG. 14. The anvil 66 comprises a tapered surface which forms an inclusive tapered angle A between 4 and 12 degrees. More particularly, the tapered surface which forms an inclusive tapered angle A of about 8 degrees. Thus, the main portion 42 of the collar 14 after the swaging has an inclination of about 4 degrees relative to the collar axis. In an assembled state of the fastener, the collar axis corresponds to the longitudinal axis X. When placed, the tapered anvil 66 swages the main portion of the collar (which for instance is cylindrical) down in a correspondingly tapered shape.

Figure 5:
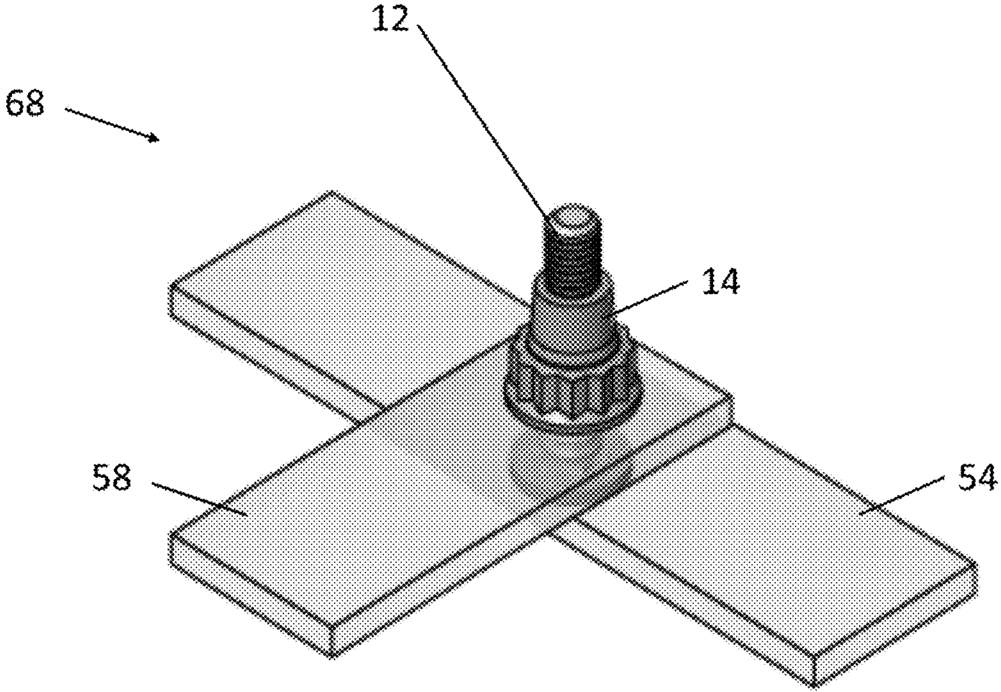
FIG. 5 shows a perspective view of a fastening assembly comprising the fastener of FIG. 1 assembled to a structure.

FIG. 5 shows a fastening assembly 68 after the swaging. The fastening assembly comprises the structure 34 and the assembled fastener 10 with a conical main portion 42. The indicator bars 52 in the assembled state of the fastener 10 are not visible anymore (see for instance FIG. 5), which indicates that the swaging was complete. An operator may disassemble the fastening assembly of FIG. 5 by using a demounting tool and unscrewing the assembled collar through the drive portion. As visible in FIG. 5, the drive portion 48 of the collar 14 has not been plastically deformed during the assembly. The unscrewed swaged collar can be refitted or can eventually be replaced with a conventional nut if the swaged collar gets damaged as removed or lost after removal.

The collar 14 may also be made without drive portion 48, as better illustrated in FIG. 13B which shows another embodiment of a collar for a fastener according to the invention. More particularly, the collar 14' of FIG. 13B is for instance adapted to cooperate with the stud of FIG. 13A. The collar 14' of FIG. 13B comprises the first collar end 36', the second collar end 38' and the central through bore 40' extending from the first collar end 36' to the second collar end 38'. The central through bore 40' defines the bore diameter Db. The collar 14' further comprises the main portion 42' adapted to be swaged onto a locking portion of a shaft. The main portion 42' is for instance sensibly cylindrical. The second collar end 38' is provided with a chamfer 44'. The first collar end 36' is provided with a flange 46'.

As mentioned, the collar 14' of FIG. 13B is adapted to cooperate with the stud 12' of FIG. 13A. The stud 12' comprises the head 16' and the shaft 18'. The shaft 18' has the locking portion 24'. The locking portion 24 comprises a constant or sensibly constant cross-section and defines a shaft diameter Ds. The locking portion 24' comprises a plurality of annular locking grooves, as schematically depicted in FIG. 13A. The locking grooves are entirely, or substantially, annular in form, and so ensure that separation of the collar from the shaft by an unscrewing action cannot occur after installation of the fastener, e.g., the collar cannot become separated from the shaft via rotation. In such case, the diameter Ds is measured from groove crest to crest. The shaft 18' further comprises a segment S2' forming a pulling portion (also called retaining feature). The second segment S2' is for instance a threaded portion adapted to engage a drive nut of an installation tool, as described above in reference to FIG. 4 and FIG. 6.

In the first embodiment described above in reference notably to FIG. 1, 2A, FIG. 2B, FIG. 2C, FIG. 3A, FIG. 3B, FIG. 4, FIG. 5, FIG. 6, the fastener comprises a clinch stud capable of clinching itself when driven into a material of a structure. However, according to a second embodiment of the invention, the stud of the fastener 10 may also be a weld stud, as schematically depicted in FIG. 7.

Figure 7:
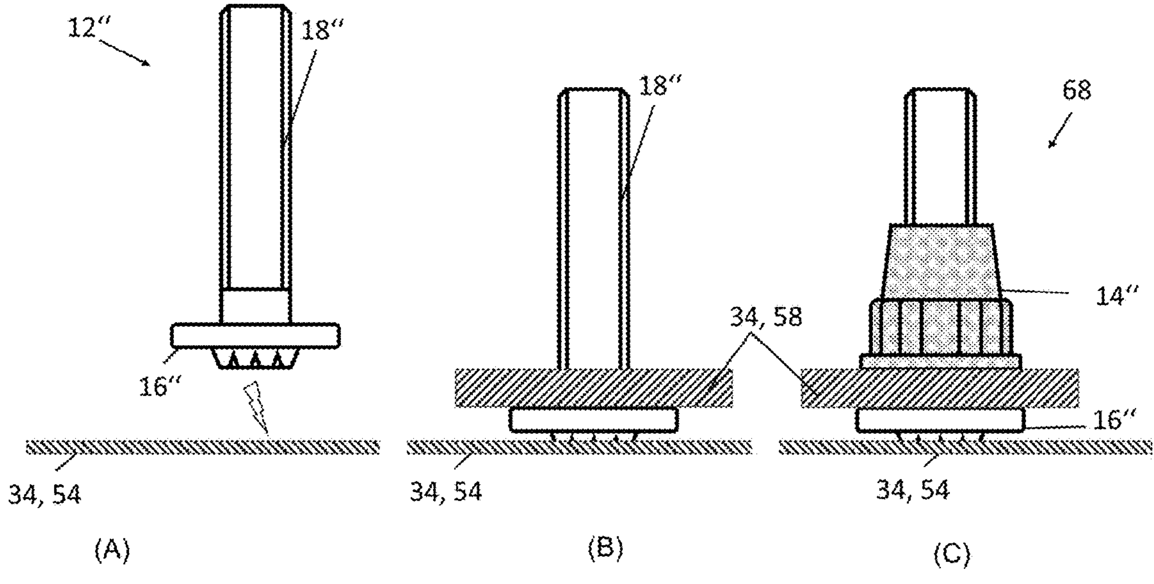
FIG. 7 schematically shows assembly steps of a fastener according to another embodiment of the invention to a structure, wherein the fastener comprises a weld stud.

In the embodiment of FIG. 7, corresponding to a second embodiment, the stud 12" comprises a flanged head 16" (in order to avoid the swaging load being transmitted through the weld). The stud 12" comprises a shaft 18". The shaft may have a constant cross-section. The shaft is provided with a locking portion and a pulling portion. The locking portion and the pulling portion may be formed by a unique threaded portion (as disclosed with regard to FIG. 1 for instance), or the locking portion and the pulling portion may be two separated portions (as described above in relation with FIG. 13A). A workpiece 54 is provided and an arc is ignited between the head 16" of the stud and the workpiece (step A of FIG. 7). Both the head 16" and a joining area of the workpiece 54 are melted and then joined under a predetermined contact pressure. Once the stud 12" has been joined to the first workpiece 54, in a subsequent step which can occur at a later stage, a second workpiece 58 is fitted to the shaft (step B) and the collar 14" is then fixed to the shaft (step C), as described above.

Figure 8:
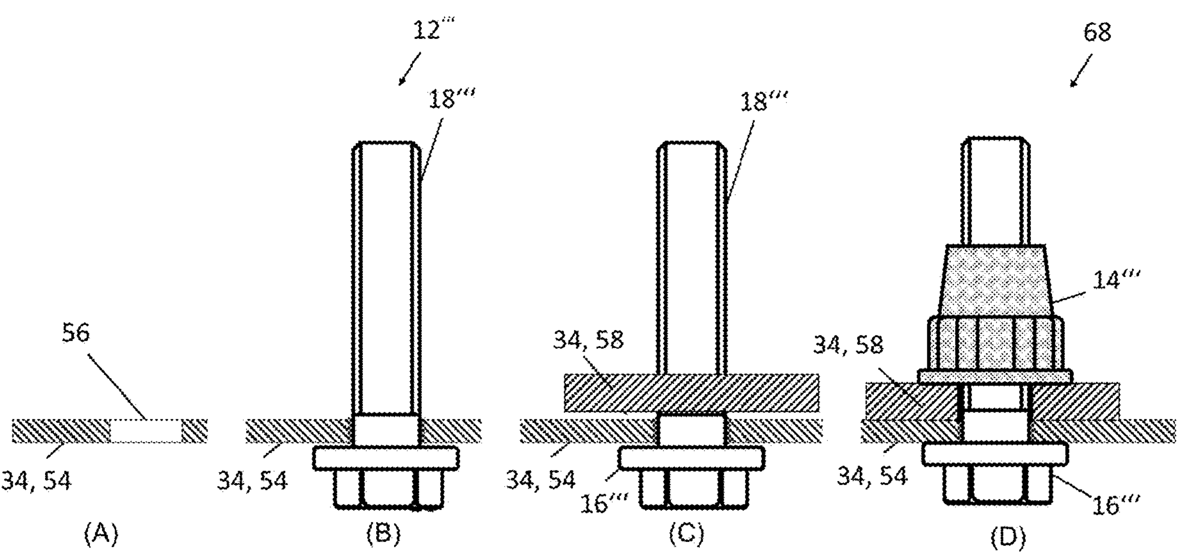
FIG. 8 schematically shows assembly steps of a fastener according to a third embodiment of the invention to a structure, wherein the fastener comprises a stud loosely received in a hole of a workpiece.

In a third embodiment, schematically represented in FIG. 8, the stud may be a loose bolt 12'''. The structure 34 comprises for instance the first workpiece 54 with the hole 56. (Step (A) in FIG. 8). The head 16''' of the loose bolt 12''' is for instance held lightly into the hole 56 (Step (B) of FIG. 8). A second workpiece 58 can be fitted over the shaft 18''' (step (C)) and an installation tool can engage with the second end of the stud (for instance the installation tool can spin on the pulling portion) and then swage the collar 14''' to form the fastening assembly visible in Step (D).

Figure 9:
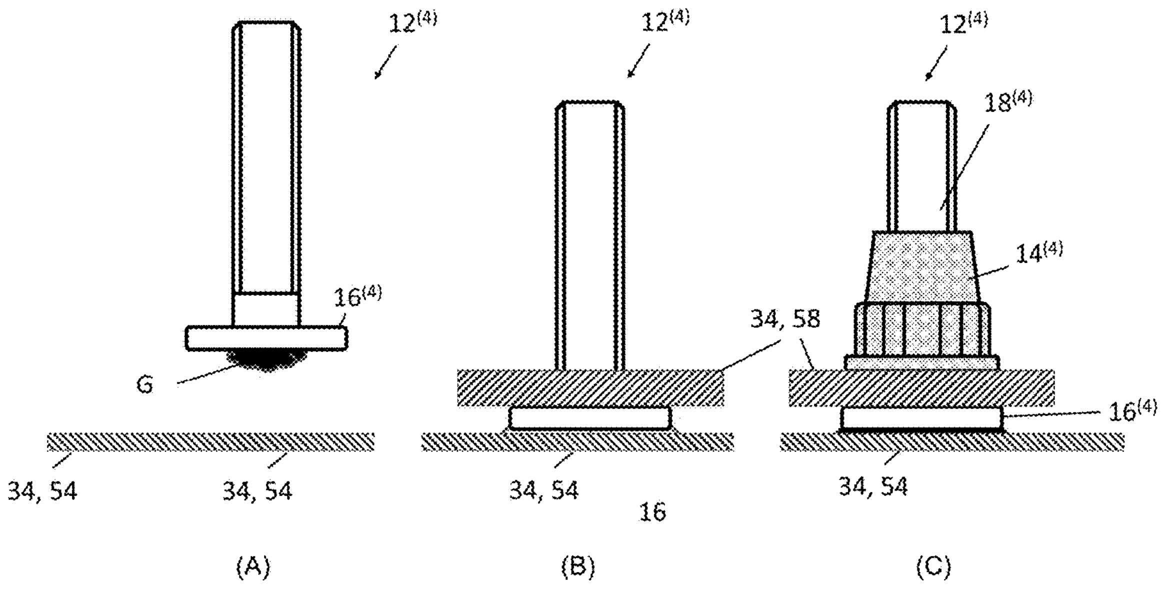
FIG. 9 schematically shows assembly steps of a fastener according to a fourth embodiment of the invention to a structure, wherein the fastener comprises a glue stud.

In a fourth embodiment, the stud is a glue stud 12(4). Such glue studs can be bonded to metal or even glass. An adhesive G is provided on the upper side of the head (step (A) in FIG. 9), and the upper side of the head is pressed against the workpiece 54. The wide head and structural adhesive provide high strength. Once the stud 12(4) has been bonded to the first workpiece 54, a second workpiece 58 is fitted over the shaft 18(4) (step (B) in FIG. 9). The collar 14(4) is then swaged to form a fastening assembly (step (C) in FIG. 9). The collar clamp load is not transmitted through the bonded joint during placing.

Figure 10:
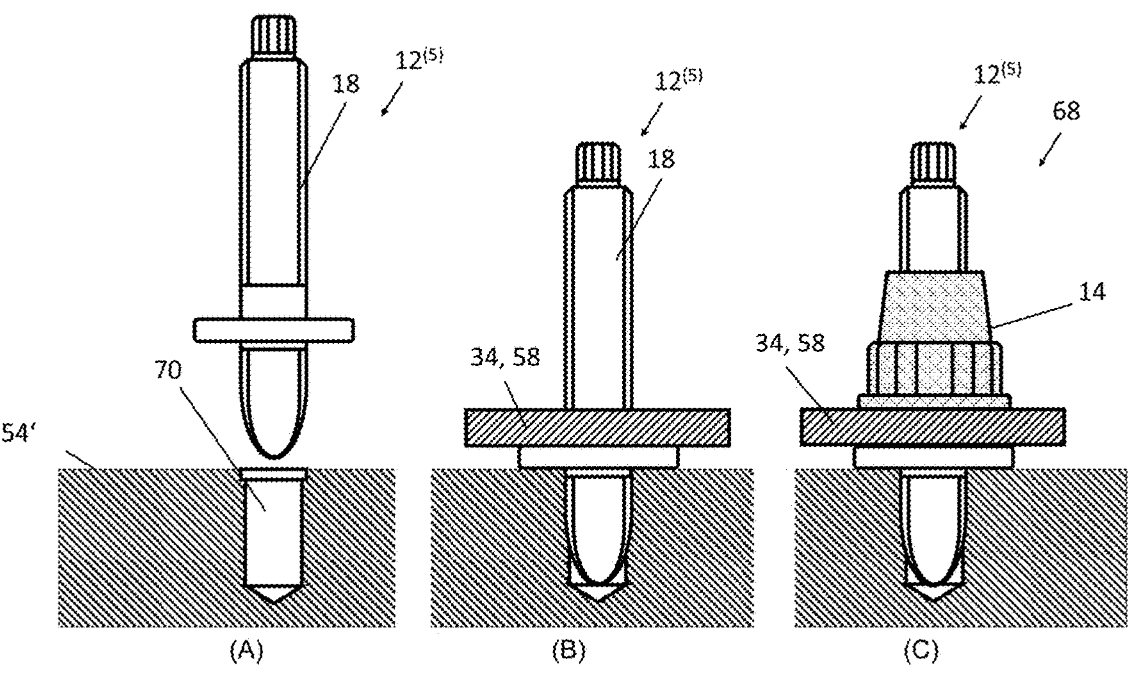
FIG. 10 schematically shows assembly steps of a fastener according to a fifth embodiment of the invention to a structure, wherein the fastener comprises a self-tapping stud.

In a fifth embodiment, the stud 12(5) is a self-tapping stud comprising a head 16(5) having a thread form allowing the stud to be installed into a plain hole 70 of a casting 54' (Step (A) in FIG. 10). A second workpiece 58 is fitted over the shaft 18(5) (step (B) in FIG. 10). The collar 14(5) is then swaged to form a fastening assembly (step (C) in FIG. 10). In this case the stud 12(5) has a head 16(5) with a flange which would carry the collar clamp load. The torque to screw the stud 12(5) into the casting 54' is applied via a drive “stem” on the tip of the shaft 18(5) which can be a hexagonal or external TORX drive for example. Provided the thread engagement in the casting is long enough, one could delete the flange of the head completely and allow the thread to carry the full swage load. The stud 12(5) might alternatively have a conventional thread at the lower end, but this would mean tapping the casting, which adds cost and process time.

Figure 11:
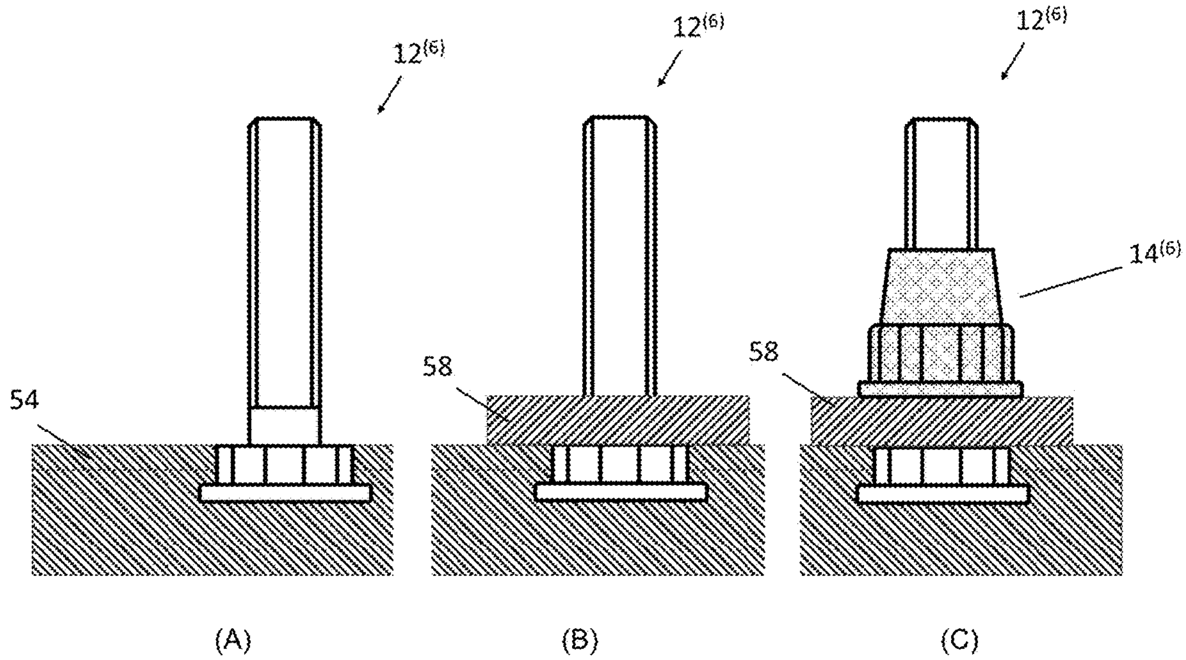
FIG. 11 schematically shows assembly steps of a fastener according to a sixth embodiment of the invention to a structure, wherein the fastener comprises a plastic in-mold stud.

In a sixth embodiment, schematically depicted in FIG. 11 the stud is a moulded-in-stud 12(6). The stud 12(6) can be pre-inserted into injection moulding dies (Step (A) in FIG. 11). A second workpiece 58 is fitted over the shaft 18(6) (step (B) in FIG. 11). The collar 14(6) is then swaged to form a fastening assembly (step (C) in FIG. 10). In this example the collar swaging load is carried by the stud head which is flush with the surface of the plastic moulding.

fastener 10
stud 12
collar 14
head 16
shaft 18
first end 20
second end 22
locking portion 24
shaft diameter Ds
first segment S1
second segment S2
underside 26
displacement features 28
retention groove 30
retention ring 32
structure 34
first collar end 36
second collar end 38
central through bore 40
main portion 42
chamfer 44
flange 46
drive portion 48
interface portion 50
protrusions or indicator bars 52
first workpiece 54
hole 56
a second workpiece 58
installation tool 60
drive nut 62
nose piece 64
tapered anvil 66
fastening assembly 68
plain hole 70

What is claimed is:

1. Fastener comprising:

a stud having a head, and a shaft extending along a longitudinal axis (X) and defining a shaft length (Ls), wherein the shaft comprises a locking portion, said locking portion defining a shaft diameter (Ds);

a collar adapted to be fitted over the locking portion of the shaft, the collar comprising a first collar end, a second collar end, a central through bore extending from the first collar end to the second collar end, the central through bore defining a bore diameter (Db), and a main portion adapted to be swaged onto the locking portion, characterized in that a ratio of the bore diameter (Db) to the shaft diameter (Ds) is above 1.10:1.

2. The fastener of claim 1, wherein a ratio of the bore diameter (Db) to the shaft diameter (Ds) is above 1.15:1.

3. The fastener of claim 2, wherein the collar comprises a flange provided at the first collar end, the drive portion extending between the flange and the main portion.

4. The fastener of claim 1, wherein the locking portion is a threaded portion, and the collar further comprises a drive portion adapted to be actuated by a removal tool.

5. The fastener of claim 1, wherein the main portion, before being swaged onto the locking portion, comprises a cylindrical body and a chamfer arranged at the second collar end.

6. The fastener of claim 1, wherein the central through bore is cylindrical.

7. The fastener of claim 1, wherein the head of the stud has an underside comprising displacement lobes.

8. The fastener of claim 1, wherein the stud is made in a first material, the collar is made in a second material, different from the first material, wherein the tensile strength of the first material is at least 2.5 times the tensile strength of the second material.

9. The fastener of claim 1, wherein the first material is a high tensile steel, and the second material is an annealed, low-carbon steel.

10. The fastener of claim 1, wherein the stud is a clinch stud or a weld stud or a loose bolt or a glue stud or a self-taping stud or an embedded stud or a moulded-in stud.

11. A fastening assembly comprising the fastener of claim 1 and a structure, wherein the fastener is assembled to the structure and secured to said structure by the collar, and wherein the main portion, after being swaged onto the locking portion has a conical shape.

12. The fastening assembly of claim 11, wherein the structure comprises a busbar or a busbar component.

13. A method of installing the fastener of claim 1 to a structure with a first and a second workpiece, comprising the steps of:

providing an installation tool comprising a nosepiece provided with a tapered anvil;

connecting the stud to the first workpiece such that the shaft at least partially protrudes from a front side of the structure;

fitting the second workpiece over the shaft;

fitting the collar onto the protruding end of the shaft from the front side of the workpiece;

actuating the installation tool such that the tool engages the shaft, and the anvil pushes the collar toward the structure;

continuing actuating the tool such that the anvil swages the collar onto the locking portion, thereby deforming the main portion to give it a conical shape and locking the collar onto the locking portion.

14. The method of claim 13, wherein the anvil has a 4 degrees to 12 degrees inclusive tapered angle.

15. The method of claim 13, wherein the fastener is made of steel and is fixed to the structure with a residual clamp greater than 7 kilonewtons.

* * * * *